US009191166B2

(12) United States Patent
Ng et al.

(10) Patent No.: US 9,191,166 B2
(45) Date of Patent: Nov. 17, 2015

(54) APPARATUS AND METHOD FOR DEFINING TIMING REFERENCE FOR SECONDARY CELLS IN A SECONDARY TIMING ADVANCE GROUP

(71) Applicant: Samsung Electronics Co., Ltd., Suwon-si, Gyeonggi-do (KR)

(72) Inventors: Boon Loong Ng, Richardson, TX (US); Gerardus Johannes Petrus van Lieshout, Apeldoorn (NL); Kyeongin Jeong, Kyungi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 90 days.

(21) Appl. No.: 13/667,498

(22) Filed: Nov. 2, 2012

(65) Prior Publication Data

US 2013/0114574 A1 May 9, 2013

Related U.S. Application Data

(60) Provisional application No. 61/613,308, filed on Mar. 20, 2012, provisional application No. 61/611,346, filed on Mar. 15, 2012, provisional application No. 61/596,539, filed on Feb. 8, 2012, provisional application No. 61/594,847, filed on Feb. 3, 2012, provisional application No. 61/556,054, filed on Nov. 4, 2011.

(51) Int. Cl.
*H04J 3/00* (2006.01)
*H04L 5/00* (2006.01)
*H04W 56/00* (2009.01)
*H04L 27/26* (2006.01)

(52) U.S. Cl.
CPC ............ *H04L 5/001* (2013.01); *H04W 56/0015* (2013.01); *H04W 56/0045* (2013.01); *H04L 27/2655* (2013.01)

(58) Field of Classification Search
CPC . H04W 72/0446; H04W 84/12; H04W 84/18; H04W 72/04; H04W 88/08; H04W 84/08
USPC ......... 370/336, 331, 329, 333, 252, 312, 335, 370/324, 330, 341, 292, 328, 338; 455/442, 455/443, 456.1, 436
See application file for complete search history.

(56) References Cited

U.S. PATENT DOCUMENTS 7,164,914 B2 *  1/2007  Moulsley et al. ............. 455/436
2010/0322291 A1  12/2010  Kaikkonen et al.
(Continued)

FOREIGN PATENT DOCUMENTS

CN  102118801 A  7/2011

OTHER PUBLICATIONS

International Search Report dated Mar. 29, 2013 in connection with International Patent Application No. PCT/KR2012/009246, 3 pages.
(Continued)

*Primary Examiner* — Chi H Pham
*Assistant Examiner* — Alexander O Boakye

(57) ABSTRACT

A user equipment (UE) is configured to perform a method for determining a timing reference for a secondary cell (SCell) in a secondary timing advance group (sTAG). The method includes selecting a SCell among a plurality of SCells within a sTAG as an uplink timing reference cell based on a predefined rule that is known at the UE and an eNB in communication with the UE. The method also includes receiving a downlink carrier from the selected SCell and determining, from the downlink carrier, a downlink timing used as a reference for an uplink transmission timing.

20 Claims, 11 Drawing Sheets

(56) References Cited

U.S. PATENT DOCUMENTS

| | | |
|---|---|---|
| 2011/0134774 A1 | 6/2011 | Pelletier et al. |
| 2011/0243009 A1 | 10/2011 | Chandrasekhar et al. |
| 2011/0249578 A1 | 10/2011 | Nayeb Nazar et al. |
| 2013/0034085 A1* | 2/2013 | Bostrom et al. .............. 370/336 |
| 2014/0233535 A1 | 8/2014 | Zhao et al. |

OTHER PUBLICATIONS

Written Opinion of International Searching Authority dated Mar. 29, 2013 in connection with International Patent Application No. PCT/KR2012/009246, 5 pages.

Extended European Search Report, dated Jun. 2, 2015, in connection with European Patent No. 12846758.6, 9 pages.

New Postcom, 3GPP TSG RAN WG2 Meeting #75bis, R2-114902, "Timing reference cell selection", Oct. 10-14, 2011, Zhuhai, China, 4 pages.

Huawei, HiSilicon, 3GPP TSG-RAN WG2 Meeting #75, R2-113994, "RACH issues for supporting multiple TAs", Aug. 22-26, 2011, Athens, Greece, 4 pages.

Intel Corporation, 3GPP TSG RAN WG2 Meeting #75bis, R2-115378, "Multiple TAT and TA Group Handling for CA", Oct. 10-14, 2011, Zhuhai, China, 4 pages.

* cited by examiner

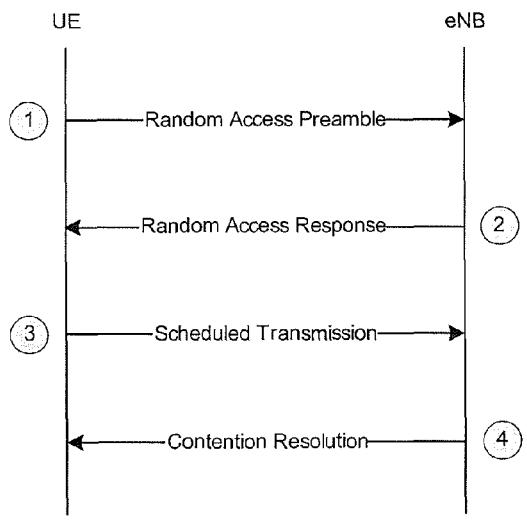
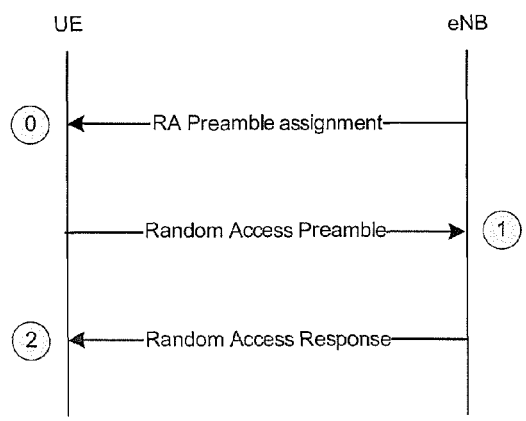
FIGURE 5A
FIGURE 5B

APPARATUS AND METHOD FOR DEFINING TIMING REFERENCE FOR SECONDARY CELLS IN A SECONDARY TIMING ADVANCE GROUP

CROSS-REFERENCE TO RELATED APPLICATION(S) AND CLAIM OF PRIORITY

The present application claims priority to U.S. Provisional Patent Application Ser. No. 61/556,054 filed Nov. 4, 2011, entitled "TIMING REFERENCE FOR SCELL(S) IN STAG"; U.S. Provisional Patent Application Ser. No. 61/594,847 filed Feb. 3, 2012, entitled "TIMING REFERENCE FOR SCELL(S) IN STAG"; U.S. Provisional Patent Application Ser. No. 61/596,539 filed Feb. 8, 2012 entitled "TIMING REFERENCE FOR SCELL(S) IN STAG"; U.S. Provisional Patent Application Ser. No. 61/611,346 filed Mar. 15, 2012 entitled "METHODS AND APPARATUS FOR UL TIMING ADJUSTMENT OF SCELL FOR LTE ADVANCED and U.S. Provisional Patent Application Ser. No. 61/613,308 filed Mar. 20, 2012, entitled "TIMING REFERENCE FOR SCELL(S) IN STAG". The content of the above-identified patent documents is incorporated herein by reference.

TECHNICAL FIELD

The present application relates generally to wireless communication systems and, more specifically, to methods for defining a timing reference for secondary cells in a secondary timing advance group.

BACKGROUND

One of the objectives of Release 11 of the 3GPP Long Term Evolution (LTE) standard is to specify the support for the use of multiple timing advances (TAs) for LTE uplink carrier aggregation. This is discussed in LTE Document No. RP-101421, titled "LTE Carrier Aggregation Enhancements". A timing advance for uplink transmission is performed by the user equipment (UE) to achieve uplink timing synchronization with the network. The support for multiple timing advances for LTE uplink carrier aggregation is necessary for cellular deployment scenarios where two aggregated cells can undergo different channel propagation delay from the UE.

SUMMARY

In accordance with an embodiment of this disclosure, a method for determining a timing reference for a secondary cell (SCell) in a secondary timing advance group (sTAG) is provided. The method includes selecting a SCell among a plurality of SCells within a sTAG as an uplink timing reference cell based on a predefined rule that is known at the UE and an eNB in communication with the UE. The method also includes receiving a downlink carrier from the selected SCell and determining, from the downlink carrier, a downlink timing used as a reference for an uplink transmission timing.

In accordance with another embodiment of this disclosure, a user equipment (UE) configured to determine a timing reference for a secondary cell (SCell) in a secondary timing advance group (sTAG) is provided. The UE includes a processor configured to select a SCell among a plurality of SCells within a sTAG as an uplink timing reference cell based on a predefined rule that is known at the UE and an eNB in communication with the UE. The processor is also configured to receive a downlink carrier from the selected SCell and determining, from the downlink carrier, a downlink timing used as a reference for an uplink transmission timing.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A and 5B illustrate contention-based and non-contention-based random access procedures in a LTE system;

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein:

(i) 3GPP Document No. RP-101421, "LTE Carrier Aggregation Enhancements" (hereinafter "REF1"); (ii) Document No. R2-111840, "Initial Consideration on Multiple TA, CATT" (hereinafter "REF2"); (iii) 3GPP Technical Specification No. 36.300, version 10.3.0, March 2011 (hereinafter "REF3"); (iv) 3GPP Technical Report No. 36.814, version 9.0.0, March 2010 (hereinafter "REF4"); (v) 3GPP Technical Specification No. 36.321, version 10.2.0, June 2011 (hereinafter "REF5"); (vi) 3GPP Technical Specification No. 36.331, version 10.2.0, June 2011 (hereinafter "REF6"); (vii) 3GPP Technical Specification No. 36.133, version 10.4.0, September 2011 (hereinafter "REF7"); (viii) 3GPP Technical Specification No. 36.331, version 10.3.0, September 2011 (hereinafter "REF8"); (ix) 3GPP Technical Specification No. 36.211, version 10.3.0, September 2011 (hereinafter "REF9"); (x) 3GPP Technical Specification No. 36.213, version 10.3.0, September 2011 (hereinafter "REF10").

Figure 1:
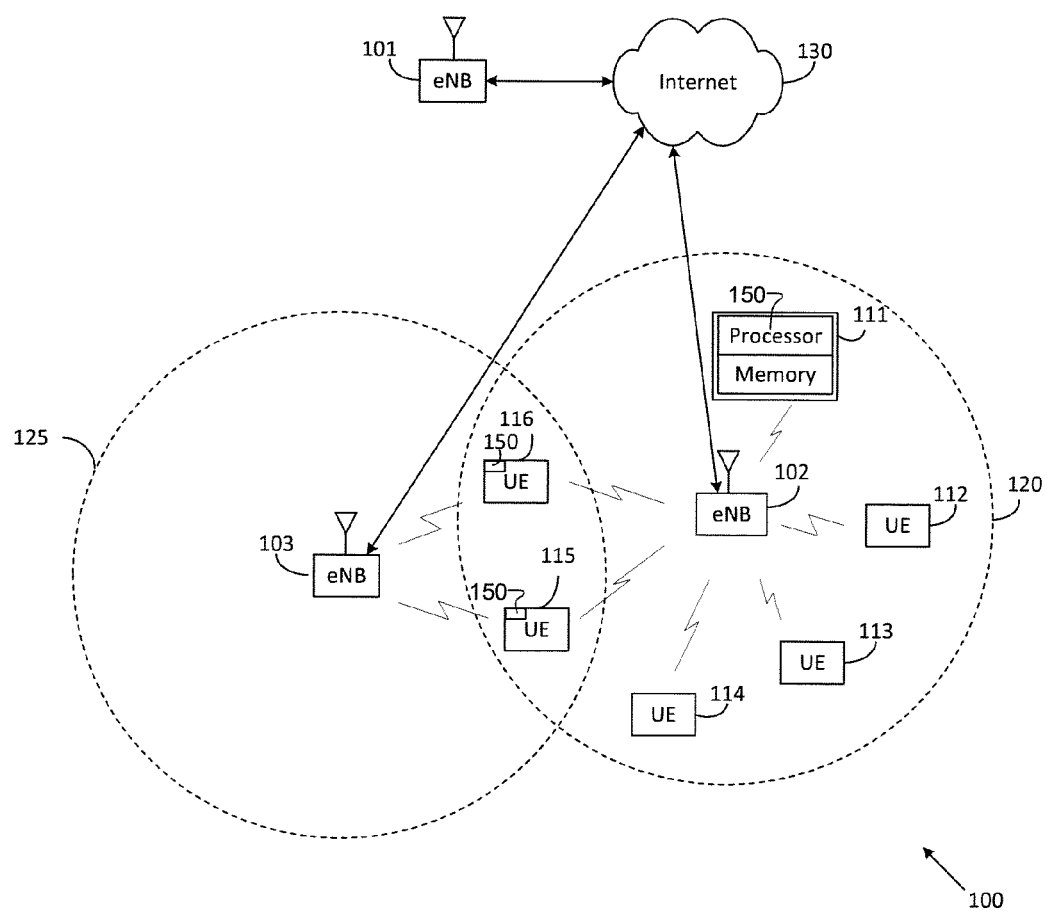
FIG. 1 illustrates a wireless network according to an embodiment of the present disclosure.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The wireless network 100 includes eNodeB (eNB) 101, eNB 102, and eNB 103. The eNB 101 communicates with eNB 102 and eNB 103. The eNB 101 also communicates with Internet protocol (IP) network 130, such as the Internet, a proprietary IP network, or other data network.

Depending on the network type, other well-known terms may be used instead of "eNodeB," such as "base station" or "access point". For the sake of convenience, the term "eNodeB" shall be used herein to refer to the network infrastructure components that provide wireless access to remote terminals.

The eNB 102 provides wireless broadband access to network 130 to a first plurality of user equipments (UEs) within coverage area 120 of eNB 102. The first plurality of UEs includes UE 111, which may be located in a small business; UE 112, which may be located in an enterprise; UE 113, which may be located in a WiFi hotspot; UE 114, which may be located in a first residence; UE 115, which may be located in a second residence; and UE 116, which may be a mobile device, such as a cell phone, a wireless laptop, a wireless PDA, or the like. UEs 111-116 may be any wireless communication device, such as, but not limited to, a mobile phone, mobile PDA and any mobile station (MS).

For the sake of convenience, the term "user equipment" or "UE" is used herein to designate any remote wireless equipment that wirelessly accesses an eNB, whether the UE is a mobile device (e.g., cell phone) or is normally considered a stationary device (e.g., desktop personal computer, vending machine, etc.). In other systems, other well-known terms may be used instead of "user equipment", such as "mobile station" (MS), "subscriber station" (SS), "remote terminal" (RT), "wireless terminal" (WT), and the like.

The eNB 103 provides wireless broadband access to a second plurality of UEs within coverage area 125 of eNB 103. The second plurality of UEs includes UE 115 and UE 116. In some embodiment, eNBs 101-103 may communicate with each other and with UEs 111-116 using LTE or LTE-A techniques.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace eNBs 101-103 and UEs 111-116. Wired connections may replace the wireless connections depicted in FIG. 1.

Figure 2:
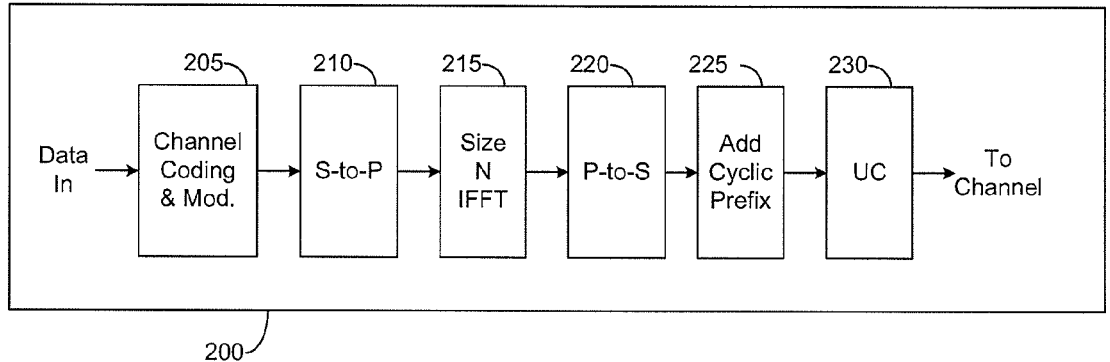
FIG. 2 illustrates a high-level diagram of a wireless transmit path according to an embodiment of this disclosure.
Figure 3:
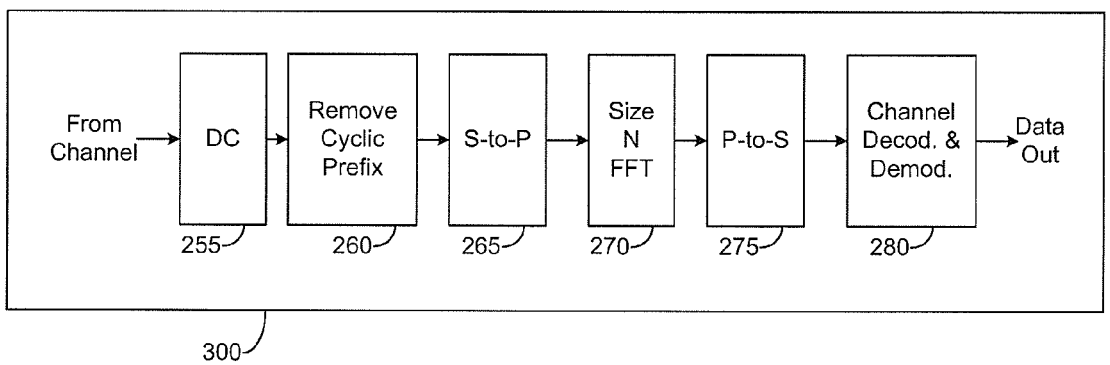
FIG. 3 illustrates a high-level diagram of a wireless receive path according to an embodiment of this disclosure.

FIG. 2 is a high-level diagram of a wireless transmit path. FIG. 3 is a high-level diagram of a wireless receive path. In FIGS. 2 and 3, the transmit path 200 may be implemented, e.g., in eNB 102 and the receive path 300 may be implemented, e.g., in a UE, such as UE 116 of FIG. 1. It will be understood, however, that the receive path 300 could be implemented in an eNB (e.g. eNB 102 of FIG. 1) and the transmit path 200 could be implemented in a UE.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2 and 3 may be implemented in software while other components may be implemented by configurable hardware (e.g., a processor 150) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in eNB 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel and reverse operations to those at eNB 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of eNBs 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to eNBs 101-103 and may implement a receive path corresponding to the architecture for receiving in the downlink from eNBs 101-103.

One of the objectives of the 3GPP Rel-11 work item "LTE Carrier Aggregation Enhancements" is to specify the support of the use of multiple timing advances (TAs) in case of LTE uplink carrier aggregation (see also REF1). A timing advance of uplink transmission is performed by a UE to achieve uplink timing synchronization with the network.

Figure 4:
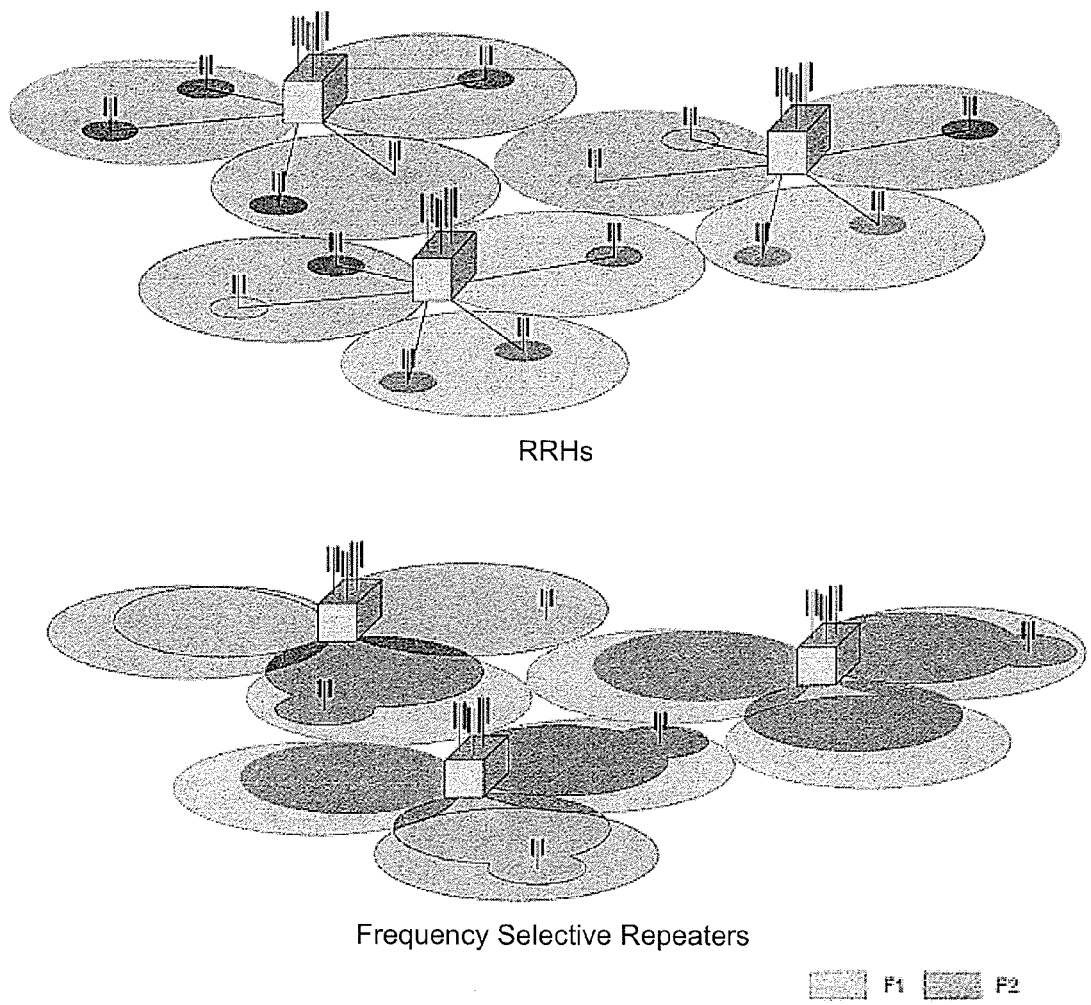
FIG. 4 illustrates a network of primary and secondary cells according to an embodiment of this disclosure.

The support of multiple timing advances for LTE uplink carrier aggregation may be needed for cellular deployment scenarios where two aggregated cells are not co-located. For example, as shown in FIG. 4, one cell (e.g., a primary cell or PCell) can be used to provide macro coverage which is managed by a base station or eNodeB, and another cell (e.g., a secondary cell or SCell) can be used to provide local coverage within the macro coverage. The SCell can be attached to a remote radio head (RRH) (top of FIG. 4) or a frequency selective repeater (bottom of FIG. 4). The deployment scenarios are described in greater detail below. It has been agreed in the RAN2#73bis meeting that all deployment scenarios listed in REF2 are not precluded from the support of multiple timing advances. A group of cells that share the same UL timing is referred to as a Timing Advance Group (TAG).

One method to enable multiple timing advances is to support random access procedures on the SCell, which does not share the same timing advance as the PCell. The current random access procedures for LTE are illustrated in FIGS. 5A and 5B. FIG. 5A illustrates a contention-based random access procedure, and FIG. 5B illustrates a non-contention based random access procedure. The steps for the random access procedures are described in Section 10.1.5 of REF3. For example, as shown in FIG. 5A, in LTE Release 10 ("Rel-10"), in a contention-based random access procedure, steps 1, 2 and 3 occur on the PCell while the contention resolution (step 4) can be cross-scheduled by the PCell (i.e., the actual DL assignment is for the SCell). As shown in FIG. 5B, in a non-contention-based random access procedure, step 0, step 1, and 2 occur on the PCell.

In Rel-10, the UE has a configurable timer, identified as timeAlignmentTimer, which is used to control Uplink Time Alignment. Uplink Time Alignment is associated with how long the UE is considered to be aligned with the network for uplink communication. This duration is configured by the information element (IE) TimeAlignmentTimer, as shown in Table 1 below (see also REF5 and REF6). In Table 1, the value sf500 corresponds to 500 sub-frames, value sf750 corresponds to 750 sub-frames, and so forth.

TABLE 1

| TimeAlignmentTimer information element (IE) |
| --- |
| -- ASN1START<br>TimeAlignmentTimer ::=    ENUMERATED {<br>                    sf500, sf750, sf1280, sf1920, sf2560,<br>sf5120,<br>                    sf10240, infinity}<br>-- ASN1STOP |

The maintenance of Uplink Time Alignment is detailed in Sec 5.2 of REF5. In general, the timeAlignmentTimer is started or restarted by the UE upon receiving a Timing Advance Command in a MAC control element or in a Random Access Response message. After the expiry of the timeAlignmentTimer, the corresponding cell is considered by the UE to be UL out-of-sync. In Rel-10, uplink time alignment is common for all serving cells. That is, during the active duration of the timeAlignmentTimer, all serving cells are considered to be UL aligned. Likewise, after the expiry of the timeAlignmentTimer, all serving cells are considered to be UL out-of-sync.

To date, the following features have been agreed upon in 3GPP to support multiple TAs:

Serving cells having an uplink to which the same TA applies (typically corresponding to the serving cells hosted by the same receiver) are grouped in a TA group. Each TA group includes at least one serving cell with configured uplink, and the mapping of each serving cell to a TA group is configured by the serving eNB. The mapping between a SCell and a TA group may be reconfigured. A PCell may not change its TA group. A UE supporting multiple TAs is required to support at least two TA groups (i.e., one TA group containing the PCell (primary TAG or pTAG), and one or more TA groups not containing the PCell (secondary TAG or sTAG)).

With respect to TA maintenance, the following features have been agreed upon:

TA maintenance for pTAG follows Release 10 principles. To obtain initial UL time alignment for a sTAG, the eNB-initiated random access (RA) procedure should be used. There is one time alignment timer (TAT) per TA group and each TAT may be configured with a different value. When the TAT associated with the pTAG expires, all TATs are considered to be expired and the UE flushes all HARQ buffers of all serving cells, clears any configured downlink assignment/ uplink grants, and the Radio Resource Control (RRC) releases the physical uplink control channel/sounding reference signal (PUCCH/SRS) for all configured serving cells, as in Release 10.

When the TAT associated with sTAG expires, SRS transmissions are stopped on the corresponding SCells, but the type-1 SRS configuration is maintained (FFS if type-0 SRS configuration is released). The CSI reporting configuration for the corresponding SCells is maintained. The MAC flushes the uplink HARQ buffers of the corresponding SCells. Upon deactivation of the last SCell in a sTAG, the UE does not stop the TAT of the TA group. Upon removal of the last SCell in a sTAG, the TAT of the TA group should not be running. It is FFS whether this is achieved by deconfiguring the TAT or by explicitly stopping the TAT when the SCell is removed from the TA group. It is noted that the RA based solution is sufficient for supporting multiple timing advances (i.e., TDOA based solutions will not be considered for TA maintenance).

With respect to the RA procedure, the following features have been agreed upon:

RA procedures in parallel are not be supported for a UE. If a new RA procedure is requested (either by UE or network) while another RA procedure is already ongoing, it is up to the UE implementation whether to continue with the ongoing procedure or start with the new procedure.

With respect to the RA procedure on SCell(s), the following features have been agreed upon:

The eNB may initiate the RA procedure via a PDCCH order for an activated SCell. The PDCCH order is sent on the scheduling cell of the SCell. At least a non-contention based RA procedure will be supported, and FFS if contention based RA procedure is also supported. Upon new UL data arrival, the UE does not trigger an RA procedure on a SCell. The PDCCH for Msg2 can be sent on a different serving cell than the SCell in which the preamble was sent. It is noted that FFS whether other RA procedure triggers on SCells than the PDCCH order are introduced (eNB initiated). TA grouping is performed without requiring any additional UE assisted information.

Figure 6:
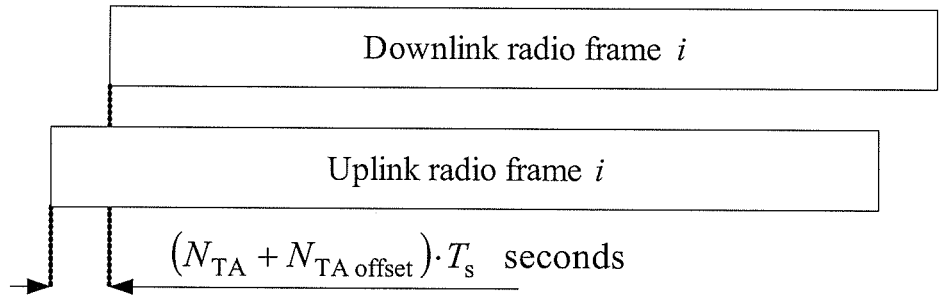
FIG. 6 illustrates an example of a timing relation between an uplink and a downlink.

According to REF9 (Release 10), the uplink-downlink timing relation is described as follows. Transmission of the uplink radio frame number i from the UE starts $(N_{TA}+N_{TA\ offset}) \times T_s$ seconds before the start of the corresponding downlink radio frame at the UE, where $0 \leq N_{TA} \leq 20512$, $N_{TA\ offset}=0$ for frame structure type 1 and $N_{TA\ offset}=624$ for frame structure type 2. An example of the uplink-downlink timing relation is shown in FIG. 6. It is noted that not all slots in a radio frame may be transmitted. One example of this is TDD, where only a subset of the slots in a radio frame is transmitted.

According to REF7 (Release 10), the reference cell for SCell(s) is described as follows. The UE has the capability to follow the frame timing change of the connected eNodeB. The uplink frame transmission takes place $(N_{TA}+N_{TA\ offset}) \times T_s$ seconds before the reception of the first detected path of the corresponding downlink frame from the reference cell. When the UE is configured with SCell(s), it uses the PCell as the reference cell for deriving the UE transmit timing.

According to REF10 (Release 10), the UL transmission timing adjustment in response to the TA command is performed as follows. Upon reception of a timing advance command, the UE adjusts its uplink transmission timing for PUCCH/PUSCH/SRS of the primary cell. The timing advance command indicates the change of the uplink timing relative to the current uplink timing as multiples of $16T_s$. The start timing of the random access preamble is specified in REF10. The UL transmission timing for PUSCH/SRS of a secondary cell is the same as the primary cell.

For a random access response, an 11-bit timing advance command $T_A$ indicates $N_{TA}$ values by index values of $T_A=0, 1, 2, \ldots, 1282$, where an amount of the time alignment is given by $N_{TA}=T_A \times 16$. $N_{TA}$ is defined in REF10.

In other situations, a 6-bit timing advance command $T_A$ indicates adjustment of the current $N_{TA}$ value, $N_{TA,\ old}$, to the new $N_{TA}$ value, $N_{TA,new}$, by index values of $T_A=0, 1, 2, \ldots, 63$, where $N_{TA,new}=N_{TA,old}+(T_A-31) \times 16$. Here, adjustment of the $N_{TA}$ value by a positive or a negative amount indicates advancing or delaying the uplink transmission timing by a given amount respectively.

For a timing advance command received on subframe n, the corresponding adjustment of the timing applies from the beginning of subframe n+6. When the UE's uplink PUCCH/PUSCH/SRS transmissions in subframe n and subframe $n_+1$ are overlapped due to the timing adjustment, the UE transmits complete subframe n and not transmit the overlapped part of subframe n+1.

If the received downlink timing changes and is not compensated or is only partly compensated by the uplink timing adjustment without timing advance command (as specified in REF10), the UE changes $N_{TA}$ accordingly.

One of the open issues is the definition of the timing reference for UL transmission timing for SCell(s) in a sTAG. In Release 10, SCell(s) have the same UL transmission timing as the PCell and the reference cell is the PCell. However, if the SCell(s) belong to a different network node than that of the PCell (thereby requiring a different TA), using the PCell as the reference cell may not be appropriate.

Embodiments of this disclosure address the problem of defining the timing reference for UL transmission timing adjustment for SCell(s) in a sTAG.

In an embodiment of this disclosure (hereinafter referred to as "Embodiment 1"), the reference cell for deriving the UE transmit timing for one or more SCells in a sTAG (i.e., the TAG that doesn't include the PCell) is determined by the UE according to a predefined rule. The predefined rule is known at the eNB and the UE. More specifically, the downlink timing used as the reference for UL transmission timing for the SCell(s) in the sTAG is obtained from the DL carrier of the SCell within the sTAG that is determined as the reference cell according to the predefined rule.

In some networks, there may be more than one SCell in a sTAG. The SCell determined as the reference cell is denoted as $SCell_{ref}$. $SCell_{ref}$ is the reference cell for deriving the initial Msg1 timing as well as for maintaining the time lock for subsequent UL transmissions. $SCell_{ref}$ is also the reference for the UL autonomous timing adjustment procedure defined in REF7.

Figure 7:
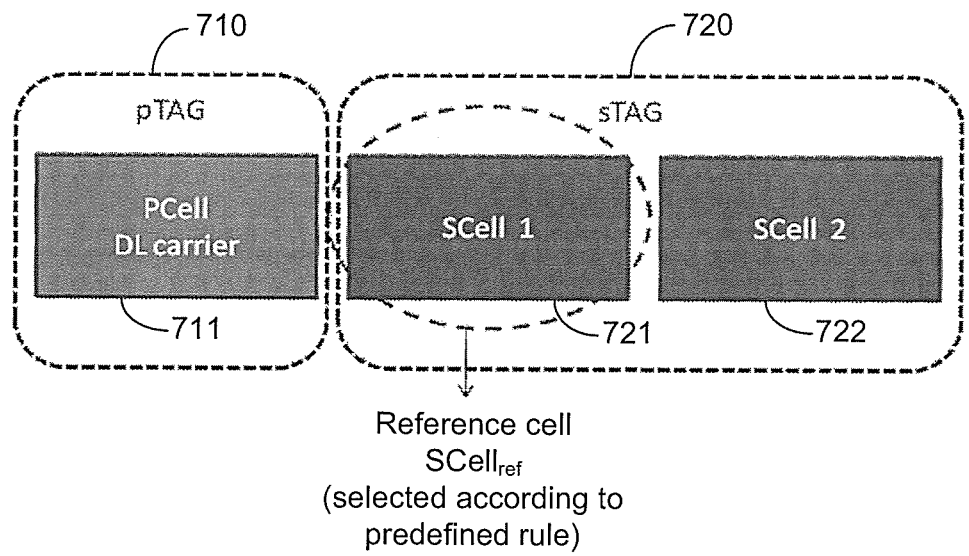
FIG. 7 illustrates a timing reference for uplink transmission timing for a secondary cell (SCell) in a secondary timing advance group (sTAG), according to an embodiment of this disclosure.

FIG. 7 illustrates a timing reference for uplink transmission timing for a SCell in a sTAG, according to Embodiment 1. The embodiment illustrated in FIG. 7 is for illustration only. Other embodiments could be used without departing from the scope of this disclosure.

As shown in FIG. 7, a network includes a pTAG 710 and a sTAG 720. The pTAG 710 includes the PCell 711. The sTAG 720 includes at least two SCells, SCell 721 and SCell 722. As shown in FIG. 7, the SCell 721 is selected to be the reference cell, which is denoted as $SCell_{ref}$. The determination of the SCell 721 as the reference cell is made by the UE according to a predefined rule.

It is advantageous to define a stable and reliable reference cell used for UL transmission timing, because such a reference cell results in a stable UL transmission timing set by the UE, and also enables testability of UE behavior for compliance. If the eNodeB and the UE coordinate which SCell is used as the reference cell, the eNodeB can also take into account which SCell should be kept activated (or kept activated frequently enough) to allow accurate timing tracking on that SCell.

When there is more than one SCell in a sTAG, one or more SCells may be configured with random access channel (RACH) configuration parameters (e.g., preamble, PRACH time and frequency resources, and the like). For example, the configuration may include one SCell in the sTAG, or a subset of SCells in the sTAG, or all of the SCells in the sTAG.

In accordance with embodiments of this disclosure, a number of different rules may be used to determine which SCell within the sTAG becomes the new reference cell $SCell_{ref}$. These rules will now be described. As used herein, a configured SCell is a SCell that has been defined as part of a carrier aggregation. Similarly, an activated SCell is defined as a configured SCell that has been activated by the network.

Rule 1: According to a first rule, the UE autonomously selects any activated SCell within the sTAG as the new reference cell. An advantage of this rule is simple implementation. No signaling from the eNB is needed. Since the SCell is activated, timing accuracy can be easily guaranteed. In one alternative of the first rule, if not all SCells are configured with RACH parameters, the UE may select among only the activated SCell(s) that are configured with RACH parameters. If there is only one such SCell that is configured with RACH parameters, then the choice of SCell is unambiguous (known by both the eNB and the UE). Optionally, if there is no such SCell available, the uplink transmission for the sTAG is stopped.

Rule 2: According to a second rule, the UE autonomously selects any configured SCell within the sTAG as the new reference cell. An advantage of this rule is simple implementation. No signaling from the eNB is needed. The reference cell can also be deactivated by the network, if needed. The network should ensure the SCell is activated frequently enough to ensure good timing accuracy. In one alternative of the second rule, if not all SCells are configured with RACH parameters, the UE may select among only the configured SCell(s) that are configured with RACH parameters. If there is only one such SCell that is configured with RACH parameters, then the choice of SCell is unambiguous (known by both the eNB and the UE). Optionally, if there is no such SCell available, the uplink transmission for the sTAG is stopped.

Rule 3: According to a third rule, the UE selects an activated SCell within the sTAG as the new reference cell using a predefined rule. An advantage of this rule is that the rule enables testability of UE behavior. No signaling from the eNB is needed. Since the SCell is activated, timing accuracy can be easily guaranteed. In one alternative of the third rule, if not all SCells are configured with RACH parameters, the UE may select among only the activated SCell(s) that are configured with RACH parameters. If there is only one such SCell that is configured with RACH parameters, then the choice of SCell is unambiguous (known by both the eNB and the UE). Optionally, if there is no such SCell available, the uplink transmission for the sTAG is stopped.

In accordance with the third rule, a SCell may be selected among the candidates according to a predefined rule. With this rule, the choice of SCell is unambiguous (known by both the eNB and the UE). For example, the activated SCell with the smallest SCellIndex (see REF8) within the sTAG may be selected. (Or another equivalent parameter, e.g., ServCellIndex, can also be used.) An advantage of this predefined rule is that it is simple.

As another example, the activated SCell with the longest remaining SCell deactivation timer may be selected. That is, the selected SCell may be the activated SCell whose deactivation timer has the most time remaining before expiration. An advantage of this predefined rule is that it prevents frequent reconfiguration of $SCell_{ref}$. As yet another example, the activated SCell with the best channel quality among activated SCells in the sTAG (e.g., the SCell with the highest reported reference signal received power (RSRP)) may be selected. An advantage of this rule is that the SCell with the best channel quality is likely to remain activated, thereby avoiding frequent reconfiguration of $SCell_{ref}$.

Rule 4: According to a fourth rule, the UE selects a configured SCell within the sTAG as the new reference cell using a predefined rule. An advantage of this rule is that the rule enables testability of UE behavior. No signaling from the eNB is needed. The reference cell can also be deactivated by the network if needed. The network should ensure the SCell is activated frequently enough to ensure good timing accuracy. In one alternative of the fourth rule, if not all SCells are configured with RACH parameters, the UE may select among only the configured SCell(s) that are configured with RACH parameters. If there is only one such SCell that is configured with RACH parameters, then the choice of SCell is unambiguous (known by both the eNB and the UE). Optionally, if there is no such SCell available, the uplink transmission for the sTAG is stopped.

In accordance with the fourth rule, a SCell may be selected among the candidates according to a predefined rule. With this rule, the choice of SCell is unambiguous (known by both the eNB and the UE). For example, the configured SCell with the smallest SCellIndex within the sTAG may be selected. (Or another equivalent parameter, e.g., ServCellIndex, can also be used.) An advantage of this predefined rule is that it is simple.

As another example, the configured SCell with the best channel quality (e.g., the SCell with the highest reported RSRP) may be selected. An advantage of this rule is that the SCell with the best channel quality is likely to remain activated, thereby avoid frequent reconfiguration of $SCell_{ref}$.

The UE selects another SCell used as $SCell_{ref}$ according to the aforementioned rule when the current $SCell_{ref}$ is deactivated or deconfigured (see FIG. 8 and FIG. 9, described in greater detail below). The UE makes this selection because a deactivated or deconfigured SCell is not suitable as a reference cell since the UE may not keep track of the DL timing for such cell. A SCell may also be deactivated or deconfigured due to its poor channel condition, in which case the SCell is not suitable as a reference cell.

The UE also selects another SCell used as $SCell_{ref}$ according to the aforementioned rule when there is a reconfiguration of the TAG such that a new reference cell is needed, e.g., because the previous $SCell_{ref}$ no longer belongs to the TAG or because two sTAGs has been merged and now there are two cells in the merged sTAG that were used as the reference cells.

There are a number of variations on when the UE should change the SCell used as $SCell_{ref}$. In one variation, the UE only changes the current $SCell_{ref}$ when the SCell has become unreliable or unavailable, e.g., as described above due to SCell deactivation and reconfiguration of the TAG. In another variation, the UE changes the SCell used as $SCell_{ref}$ according to a predefined rule if another SCell that satisfies the predefined rule becomes available as a timing reference candidate, even though the current $SCell_{ref}$ is still available and reliable (e.g., still activated and still in the same TAG). The former variation is better for reducing the frequency of $SCell_{ref}$ change.

After the reconfiguration of $SCell_{ref}$ there is a new reference cell and, consequently, a new DL timing reference for UL transmission timing. The normal UL transmission timing setting procedure resumes with the new DL timing reference. For example, in the absence of a TA command, the UE may autonomously adjust the UL transmission timing to be associated with the new DL timing reference according to the procedure defined in REF7.

Figure 8:
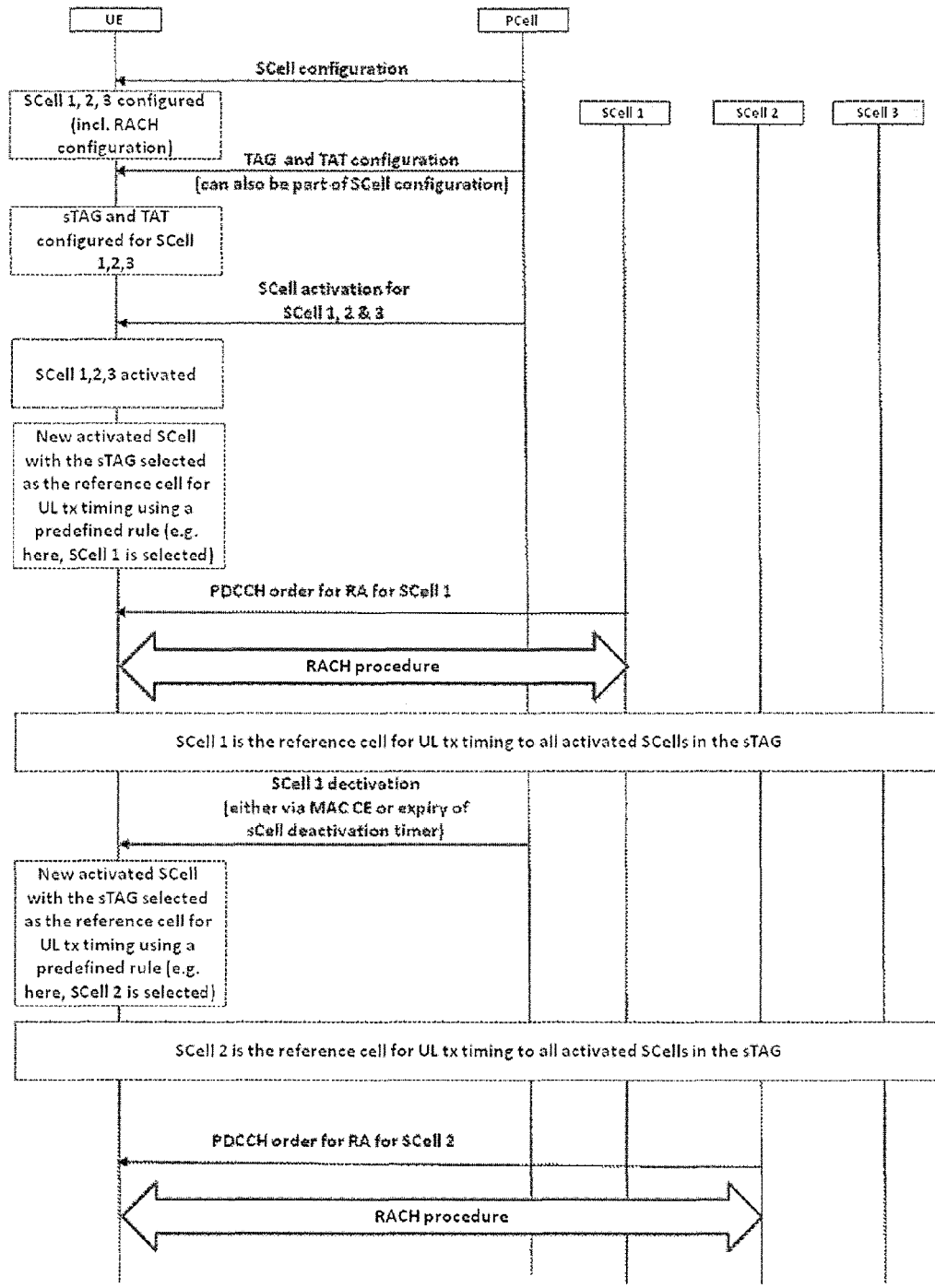
FIG. 8 illustrates how a UE determines a reference cell upon SCell activation and deactivation and monitoring of a physical downlink control channel (PDCCH) order for random access (RA) using a first alterative in accordance with this disclosure.
Figure 9:
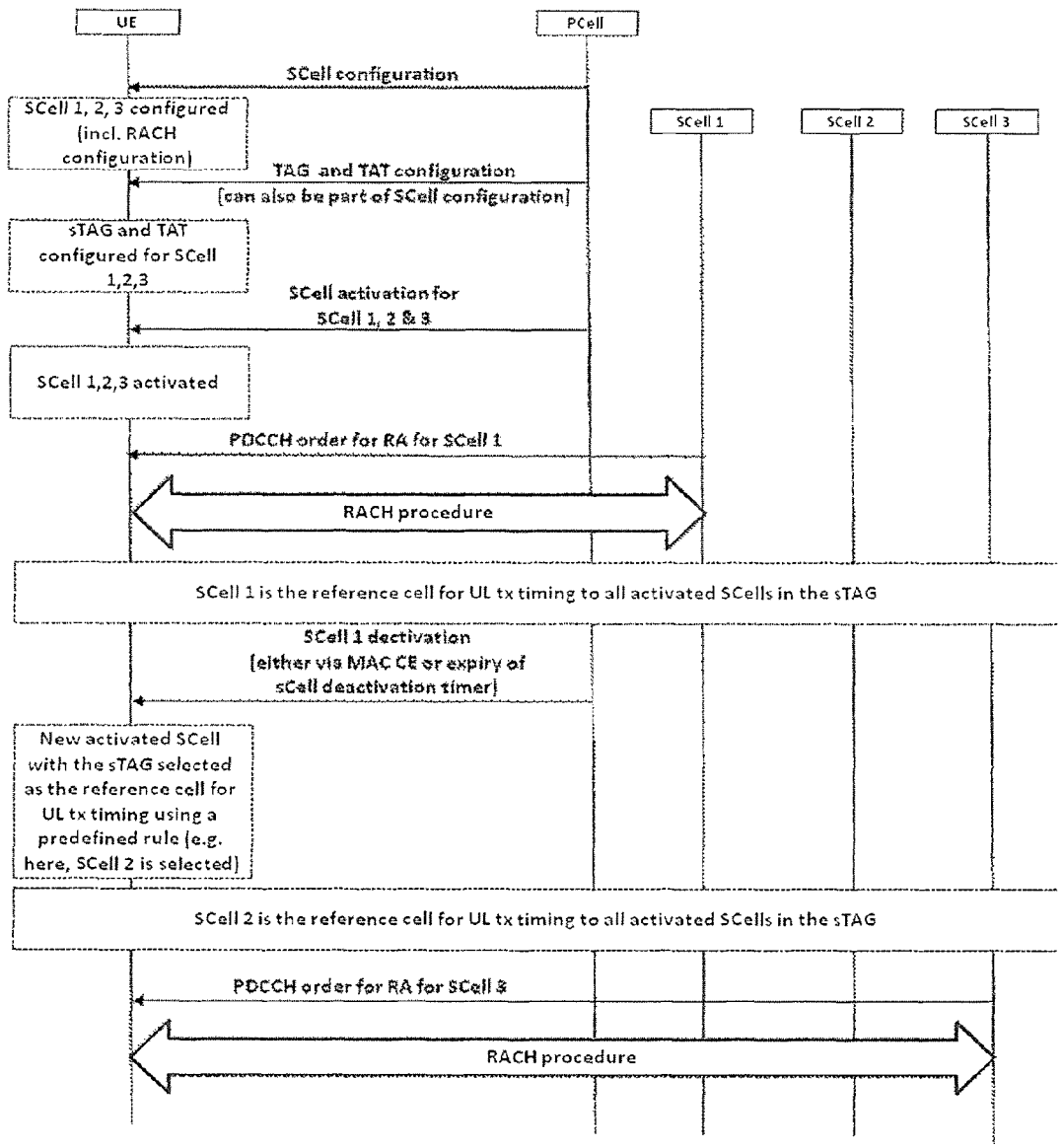
FIG. 9 illustrates how a UE determines a reference cell upon SCell activation and deactivation and monitoring of a PDCCH order for RA using a second alterative in accordance with this disclosure.

With respect to the monitoring of a PDCCH order for RA for the sTAG, a number of alternatives may be considered, as shown in FIGS. 8 and 9.

In one alternative (Alternative 1), the UE monitors the PDCCH order for RA for only the SCell configured as $SCell_{ref}$ (i.e., only one SCell). Alternative 1 is only applicable if the reference cell has to be activated (e.g., as described in Rule 1 and Rule 3 above). FIG. 8 depicts how the UE determines the reference cell upon SCell activation and deactivation and monitoring of the PDCCH order for RA using Alternative 1. The advantage is simplicity and reduced PDCCH monitoring activity for the UE.

In another alternative (Alternative 2), the PDCCH order for RA can be for any activated SCell with RACH parameters configured in the sTAG, but the choice of reference cell is not affected by the target cell of the PDCCH order for RA. FIG. 9 depicts how the UE determines the reference cell upon SCell activation and deactivation and monitoring of the PDCCH order for RA using Alterative 2. The advantage is that the RA load can be easily controlled by the network.

In another embodiment of this disclosure (hereinafter referred to as "Embodiment 1a"), if the timing reference cell (denoted as $SCell_{ref}$) is determined as detailed in the Embodiment 1, the RA preamble (Msg1) transmission, Msg3 transmission, and other types of UL transmissions use the DL timing reference from $SCell_{ref}$. This is applicable when the RA preamble and the Msg3 are transmitted on the SIB-2 linked UL carrier of $SCell_{ref}$, or when the RA preamble and the Msg3 are transmitted on another UL carrier that is not the same as the SIB-2 linked UL carrier of $SCell_{ref}$. The timing advance command obtained from the RAR (Msg2) is with respect to the DL timing reference from $SCell_{ref}$. Embodiment 1a allows a common DL timing reference for all types of UL transmission in the sTAG.

Figure 10:
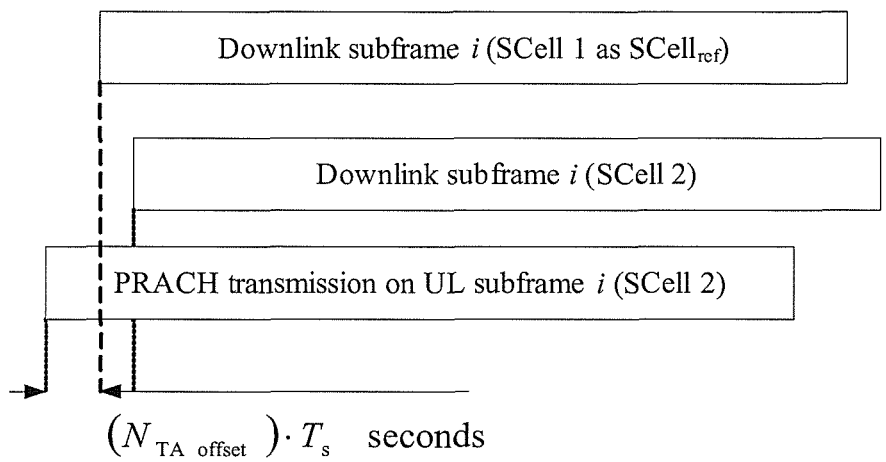
FIG. 10 illustrates a RA preamble transmission using the downlink timing reference from the determined timing reference cell.
Figure 11:
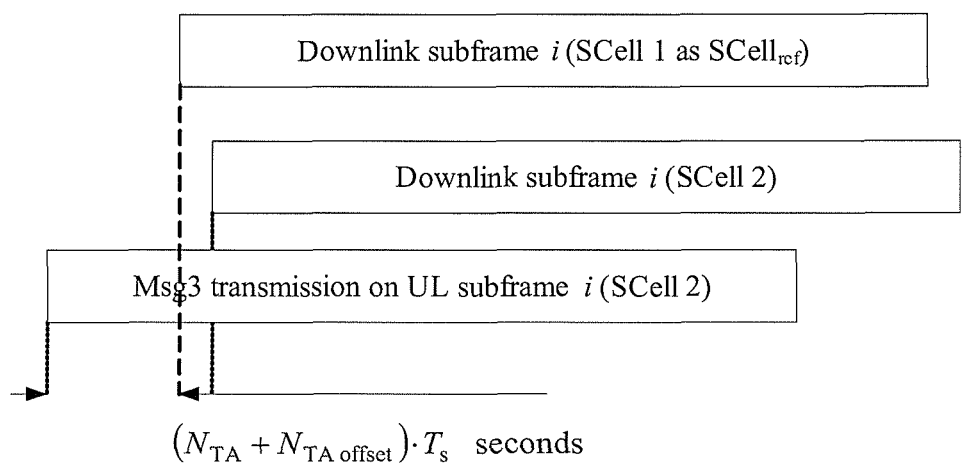
FIG. 11 illustrates a Msg3 transmission using the downlink timing reference from the determined timing reference cell.

Embodiment 1a is illustrated in FIG. 10 and FIG. 11 for Msg 1 transmission and Msg 3 transmission, respectively. FIG. 10 illustrates the RA preamble (Msg1) transmission using the downlink timing reference from the determined timing reference cell. FIG. 11 illustrates the Msg3 transmission using the downlink timing reference from the determined timing reference cell. As shown in FIGS. 10 and 11, $N_{TAOffset}$ is predefined in Section 8.1 of REF9. $N_{TA}$ is determined from the Msg2TAC. $T_s$ is the basic timing unit defined in REF9.

In another embodiment of this disclosure (hereinafter referred to as "Embodiment 2"), the reference cell for deriving the UE transmit timing for SCell(s) in a sTAG (i.e., a TAG that doesn't include the PCell) is the SCell where the RA preamble to achieve UL synchronization for the sTAG was transmitted. More specifically, the downlink timing used as the reference for UL transmission timing for the SCell(s) in the sTAG is obtained from the SIB-2 linked DL carrier, corresponding to the UL carrier where the RA preamble to achieve UL synchronization was transmitted.

Figure 12:
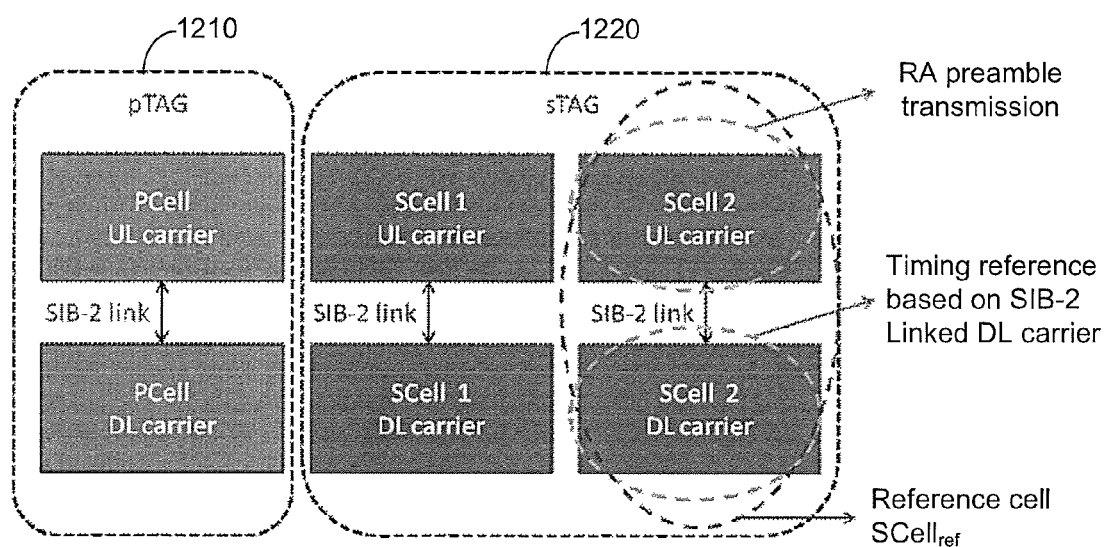
FIG. 12 illustrates a timing reference for uplink transmission timing for SCells in a sTAG according to an embodiment of this disclosure.

FIG. 12 illustrates a timing reference for uplink transmission timing for SCells in a sTAG according to Embodiment 2. The embodiment illustrated in FIG. 12 is for illustration only. Other embodiments could be used without departing from the scope of this disclosure.

As shown in FIG. 12, a network includes a pTAG 1210 and a sTAG 1220. The sTAG 1220 includes more than one SCell. The SCell determined as the reference cell is denoted as $SCell_{ref}$. $SCell_{ref}$ is the reference cell for deriving the initial Msg1 timing as well as for maintaining time lock for subsequent UL transmissions. $SCell_{ref}$ is also the reference for the UL autonomous timing adjustment procedure defined in REF7.

It is advantageous to define a stable and reliable reference cell used for UL transmission timing, because such a reference cell results in a stable UL transmission timing set by the UE, and also enables testability of UE behavior for compliance. If the eNodeB and the UE coordinate which SCell is used as the reference cell, the eNodeB can also take into account which SCell should be kept activated to allow accurate timing tracking on that SCell.

When there is more than one SCell in a sTAG, one or more SCells may be configured with RACH configuration parameters (e.g. preamble, PRACH time and frequency resources, and the like). For example, the configuration may include one SCell in the sTAG, or a subset of SCells in the sTAG, or all of the SCells in the sTAG.

The UE monitors the PDCCH order for RA for all activated SCells in the sTAG with RACH configurations. If not all SCells are configured with the RACH parameters, the UE monitors the PDCCH order for RA for only the activated SCell(s) with configured RACH parameters.

After a new PDCCH order is received to initiate the RA procedure triggers RA preamble transmission in a SCell in the sTAG which is not $SCell_{ref}$, the UE configures the SCell as $SCell_{ref}$. New DL reference timing is used when the corresponding RA preamble is transmitted. It is assumed that the SCell is already configured with the required RACH parameters (i.e., ensured by the network). The previous SCell configured as $SCell_{ref}$ is no longer the reference cell. The advantage of this process is that it enables active reconfiguration of the SCell to be used as the reference cell, by the network. The network can make a decision on which SCell to select from the RSRP reports by the UE.

Figure 13:
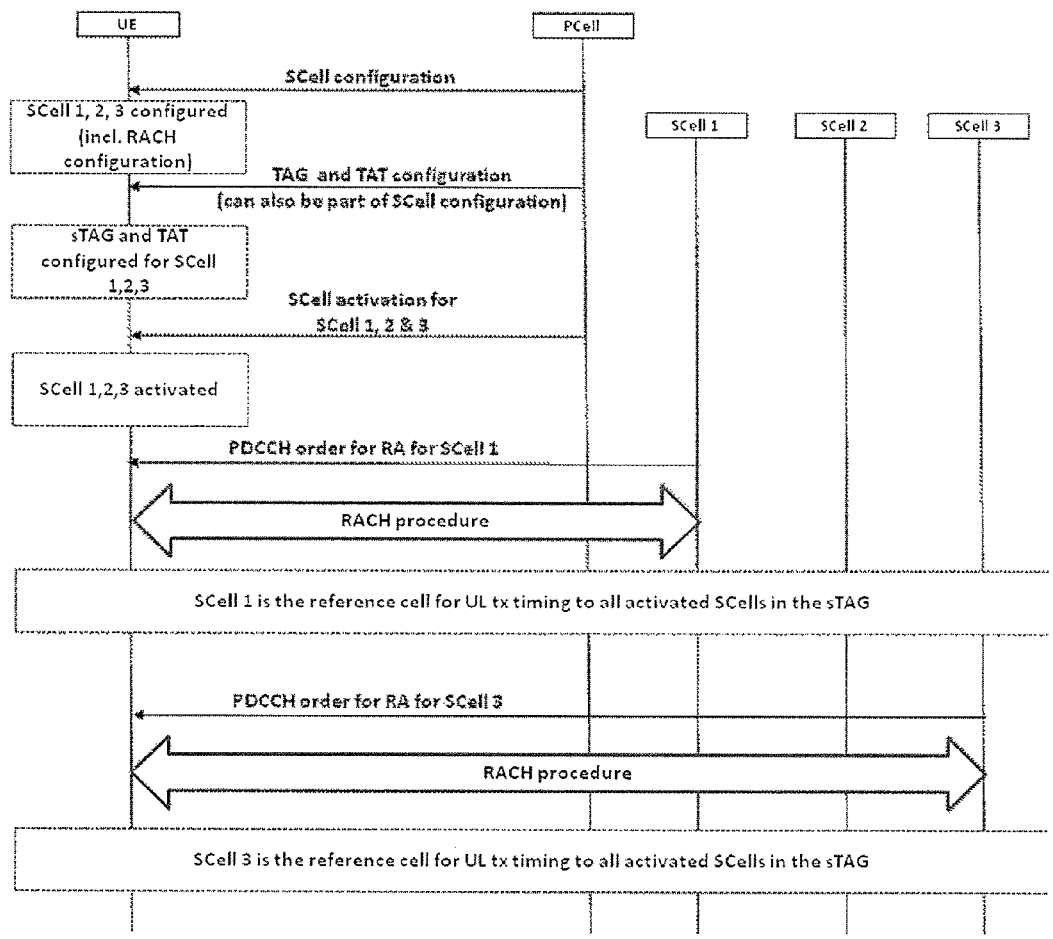
FIG. 13 illustrates how the UE determines the reference cell according to the target cell of the PDCCH order for RA, according to an embodiment of this disclosure.

After the reconfiguration of $SCell_{ref}$, there is a new reference cell and consequently new DL timing reference for UL transmission timing. The normal UL transmission timing setting procedure resumes with the new DL timing reference. For example, in the absence of a TA command, the UE may autonomously adjust the UL transmission timing to be associated with the new DL timing reference according to the procedure defined in REF7. FIG. 13 illustrates how the UE determines the reference cell according to the target cell of the PDCCH order for RA, according to Embodiment 2.

It may be the responsibility of the network to ensure that the SCell used as the reference cell is reliable (e.g., always activated or always having a good channel condition). If not, the network should change the SCell used as the reference cell as described before. However, UE behavior needs to be defined in case $SCell_{ref}$ is no longer suitable to be used as the DL timing reference before a new $SCell_{ref}$ can be determined by a new PDCCH order. This may occur due to one or more of the following: (1) $SCell_{ref}$ gets deactivated or deconfigured; (2) there is a change in TAG configuration such that a new reference cell needs to be determined; or (3) the RA procedure for $SCell_{ref}$ is not successful.

Figure 14:
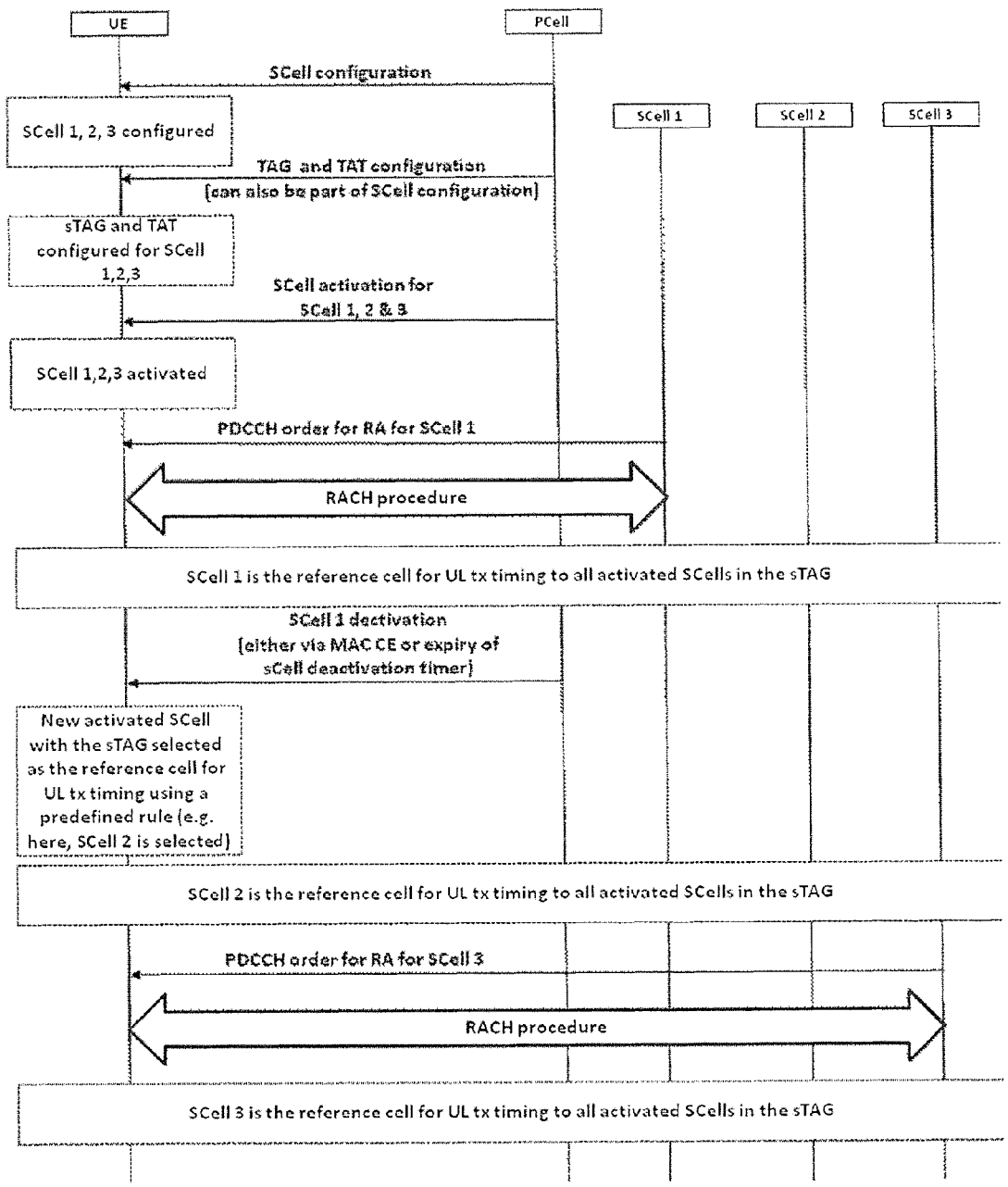
FIG. 14 illustrates a reference cell setting procedure that combines methods of different embodiments.

In one option (hereinafter referred to as "Option 1"), the methods described in Embodiment 1 and Embodiment 2 can be used together to define the UE behavior. The methods described in Embodiment 1 can be used to determine the new reference cell for the sTAG. The advantage is that UL transmissions on the other SCell(s) in the same sTAG can continue to occur as normal in case $SCell_{ref}$ is no longer suitable. FIG. 14 illustrates the reference cell setting procedure of Option 1 by combining methods of Embodiment 1 and Embodiment 2.

In another option (hereinafter referred to as "Option 2"), the UL transmissions for the sTAG (i.e., for all SCells belonging to the sTAG) are stopped (e.g. by forcing the TAT for the sTAG to expire) in case SCell$_{ref}$ is no longer suitable to be used as the DL timing reference such that a new reference cell is needed (but is not available for selection). The UE is only allowed to transmit a RA preamble if a PDCCH order to trigger a new RA procedure is received. The SCell used for the RA preamble transmission then becomes the new SCell$_{ref}$.

In yet another option (hereinafter referred to as "Option 3"), the UE uses the previous SCell$_{ref}$ (i.e., the SCell used as the timing reference cell before the current SCell$_{ref}$ that is no longer suitable) as the DL timing reference cell. If the previous SCell$_{ref}$ is also not available as the DL timing reference, due to the SCell being deactivated or deconfigured or moved from the sTAG, the UE executes Option 2.

In another embodiment of this disclosure (hereinafter referred to as "Embodiment 3"), the reception of the PDCCH order to initiate the RA procedure for a SCell by the UE restarts the SCell deactivation timer(s) for the SCell(s) involved in the RA procedure. A SCell is considered to be involved in the RA procedure if its DL carrier is used to receive a PDCCH or PDSCH related to the RA procedure (e.g., PDCCH order, RAR), or its UL carrier is used to transmit a RA preamble and Msg3 (if defined for the SCell RA procedure). The advantage of Embodiment 3 is that it helps prevent deactivation of SCell(s) involved in the RA procedure due to expiry of the SCell deactivation timer(s).

If only one SCell is involved in the RA procedure, only the SCell deactivation timer for that SCell is restarted. In some embodiments, two SCells are involved in the RA procedure. For example, SCell 1 can be used for receiving a PDCCH for the RA procedure (e.g., PDCCH order, Msg2), and SCell can be used for the RA preamble transmission and Msg3 transmission (if defined for SCell RA procedure). When two SCells are involved in the RA procedure, the SCell deactivation timers for both SCell 1 and SCell 2 are restarted upon reception of a PDCCH order in SCell 1 to trigger RA preamble transmission in SCell 2.

During the SCell RA procedure (i.e., the duration starting from successful reception of the PDCCH order to successful reception of the Msg2 RAR), if the SCell or any of the SCells involved in the SCell RA procedure is deactivated, the ongoing RA procedure is aborted by the UE, and the RA procedure is considered unsuccessful.

UL Timing Adjustments

In a 3GPP meeting in San Francisco (RAN2#76) it was discussed what the timing reference for a SCell-only TA group (TA group not containing the PCell) should be. The following features were agreed upon:

(1) The UL timing is the same for all the serving cells within the group (i.e., all UL SCells transmit simultaneously). (2) There is at any point in time one DL timing reference per group, which is used as a reference for the TA command and to lock the UL transmission to (this is the same as the PCell for Rel-10). (3) The SCell used as the downlink timing reference is to be known by the network. (4) The SCell used as downlink timing reference is to be in the same time alignment group. (5) The SIB2-linked SCell where the RA was performed is used as a timing reference for all UL SCells in the time alignment group.

In a 3GPP meeting in Dresden (RAN2#77), different organizations submitted contributions examining error cases related to agreed feature (5) described above. Two error cases were discussed online, including potential solutions.

Error case 1: The timing reference cell is deactivated.

Potential solutions discussed during the meeting for error case 1 include: (a) the UE should continue using the deactivated DL SCell as a timing reference; (b) the UE uses the activated SCell with the smallest cell index in the same TAG as the timing reference; (c) the UE always use the activated SCell with the smallest cell index in the same TAG as a timing reference (i.e., not the SIB2 linked DL SCell where RA was performed); (d) the UE suspends any uplink transmission in this TA group until the network has triggered another RA (i.e., no timing reference); (e) the UE uses the SCell where the latest (previous) RA procedure was performed; and (f) do not allow deactivation of the timing reference.

Solutions (a), (b), (d), (e), and (f) would mean that the current agreed feature (5) is kept and possibly extended while (c) would mean that the agreement 5 would be reverted.

Error case 2: What should happen when a Random Access procedure is performed on a SCell in a SCell-only TA group and the SCell performing the Random Access procedure is not the current timing reference cell.

Potential solutions discussed during the meeting for error case 2 include: (a) suspend all UL transmission in this TA group until MSG2 has been received and TA applied; and (b) continue UL transmission with the previous timing reference until MSG2 has been received and TA applied.

No conclusion was reached during RAN2#77 and it was agreed to continue the discussion until the next RAN2 meeting.

UE Autonomous UL Timing Adjustment

It is specified in Sec 7.1.2 of REF7 that the UE can autonomously adjust its UL timing. The UE has the capability to follow the frame timing change of the connected eNodeB. The uplink frame transmission takes place $(N_{TA}+N_{TA\_offset}) \times T_s$ seconds before the reception of the first detected path of the corresponding downlink frame from the reference cell. When the UE is configured with SCell(s), the UE uses the PCell as the reference cell for deriving the UE transmit timing. The UE initial transmit timing accuracy, maximum amount of timing change in one adjustment, and minimum and maximum adjustment rate are defined in the following requirements.

The UE initial transmission timing error is less than or equal to $\pm T_e$, where the timing error limit value $T_e$ is specified in Table 7.1.2-1 of REF7 (shown below). This requirement applies when it is the first transmission in a DRX cycle for PUCCH, PUSCH and SRS, or it is the PRACH transmission. The reference point for the UE initial transmit timing control requirement is the downlink timing minus $(N_{TA\_Ref}+N_{TA\_offset}) \times T_s$. The downlink timing is defined as the time when the first detected path (in time) of the corresponding downlink frame is received from the reference cell. $N_{TA\_Ref}$ for PRACH is defined as 0. $(N_{TA\_Ref}+N_{TA\_offset})$ (in $T_s$ units) for other channels is the difference between UE transmission timing and the downlink timing immediately after when the last timing advance in section 7.3 of REF7 was applied. $N_{TA\_Ref}$ for other channels is not changed until the next timing advance is received.

TABLE 7.1.2-1

$T_e$ Timing Error Limit

| Downlink Bandwidth (MHz) | $T_e$ |
|---|---|
| 1.4 | $24 * T_s$ |
| ≥3 | $12 * T_s$ |

Note:
$T_s$ is the basic timing unit defined in TS 36.211 (REF9)

When the transmission is not the first transmission in a DRX cycle, or there is no DRX cycle, and when the transmission is the transmission for PUCCH, PUSCH and SRS transmission, the UE is capable of changing the transmission timing according to the received downlink frame except when the timing advance in section 7.3 of REF7 is applied. When the transmission timing error between the UE and the reference timing exceeds $\pm T_e$, the UE adjusts its timing to within $\pm T_e$. The reference timing is $(N_{TA\_Ref}+N_{TA\ offset}) \times T_s$ before the downlink timing. All adjustments made to the UE uplink timing follow these rules:

(1) The maximum amount of the magnitude of the timing change in one adjustment is $T_q$ seconds. (2) The minimum aggregate adjustment rate is $7*T_s$ per second. (3) The maximum aggregate adjustment rate is $T_q$ per 200 ms. The maximum autonomous time adjustment step $T_q$ is specified in Table 7.1.2-2 of REF7 (shown below).

TABLE 7.1.2-2

| $T_q$ Maximum Autonomous Time Adjustment Step | |
| --- | --- |
| Downlink Bandwidth (MHz) | $T_q$ |
| 1.4 | $16 * T_s$ |
| 3 | $8 * T_s$ |
| 5 | $4 * T_s$ |
| ≥10 | $2 * T_s$ |

Note:
$T_s$ is the basic timing unit defined in TS 36.211 (REF9)

Agreements on how to support multiple TA for LTE Rel-11 (See also document number R2-120928, which is hereby incorporated into the present disclosure as if fully set forth herein)

Serving cells having an uplink to which the same TA applies (typically corresponding to the serving cells hosted by the same receiver) and using the same timing reference are grouped in a TA group. Each TA group includes at least one serving cell with configured uplink, and the mapping of each serving cell to a TA group is configured by the serving eNB with RRC signaling. The mapping between a SCell and a TA group may be reconfigured with RRC signaling. A UE supporting multiple TAs is required to support at least two TA groups (i.e., one TA group containing the PCell (pTAG), whose identity will be 0, and one or more TA groups not containing the PCell (sTAG)). It is FFS if the maximum number of TA groups is two or four.

With respect to TA maintenance, the following features have been agreed upon:

TA maintenance and the timing reference for pTAG follow Release 10 principles. To obtain initial UL time alignment for a sTAG, the eNB-initiated RA procedure should be used. The timing reference for all SCells in a sTAG is the SIB2 linked downlink of the SCell on which the preamble for the latest RA procedure was sent (Exact timing when the timing reference is changed is FFS). There is one timing reference and one time alignment timer (TAT) per TA group and each TAT may be configured with a different value. When the TAT associated with the pTAG expires, all TATs are considered to be expired and the UE flushes all HARQ buffers of all serving cells, clears any configured downlink assignment/uplink grants, and RRC releases PUCCH/SRS for all configured serving cells as in Release 10.

When the TAT associated with sTAG expires, SRS transmissions are stopped on the corresponding SCells. The type-0 SRS configuration is released, but the type-1 SRS configuration is maintained. CSI reporting configuration for the corresponding SCells is maintained. The MAC flushes the uplink HARQ buffers of the corresponding SCells. Upon deactivation of the last SCell in a sTAG, the UE does not stop the TAT of the TA group. Upon removal of the last SCell in a sTAG, TAT of the TA group should not be running. It is FFS whether this will be achieved by deconfiguring the TAT or by explicitly stopping the TAT when the SCell is removed from the TA group. It is noted that the RA based solution is sufficient for supporting multiple timing advances (i.e., TDOA based solutions will not be considered for TA maintenance).

With respect to the RA procedure, the following features have been agreed upon:

RA procedures in parallel are not supported for a UE. If a new RA procedure is requested (either by UE or network) while another RA procedure is already ongoing, it is up to the UE implementation whether to continue with the ongoing procedure or start with the new procedure.

With respect to the RA procedure on SCell(s), the following features have been agreed upon:

The eNB may initiate a non-contention-based RA procedure only via a PDCCH order for an activated SCell. This PDCCH order is sent on the scheduling cell of this SCell. Upon new UL data arrival the UE does not trigger an RA procedure on an SCell. The PDCCH for Msg2 can be sent on a different serving cell than the SCell in which the preamble was sent. Upon reaching the maximum number of transmitted preambles, the MAC does not indicate it to RRC i.e. RLF is not triggered, and the UE will not report this condition to eNB.

With respect to pathloss reference handling, the following features have been agreed upon:

The pathloss reference handling of pTAG follows Release 10 principles. For each uplink in a sTAG, the SIB2 linked downlink of the SCell is used as a pathloss reference.

TA grouping is performed without requiring any additional UE assisted information. FFS whether it is also possible to explicitly configure the pathloss reference within same TAG.

The following embodiments address the following issues: (1) the SCell UL transmissions behavior after the reference cell is changed within the sTAG; (2) the SCell UL transmissions behavior after the reference cell is removed from the sTAG; (3) the SCell UL transmissions behavior during the change of the reference cell; (4) the SCell UL transmissions behavior when TAG is reconfigured.

In one embodiment, a Timing Advance Group (TAG) is identified by its TAG ID. Each TAG has a reference cell used as the DL timing reference for UL transmission timing. For a TAG containing the PCell (i.e., a pTAG), the reference cell is the PCell. For a TAG containing SCell(s) only (i.e., a sTAG), the initial reference cell can be determined using one of the following methods. The initial reference cell can be: (1) the cell used for RA preamble transmission, (2) a cell determined by higher layer signaling (e.g., RRC or MAC layer signaling), or (3) implicitly determined e.g. based on its cell index.

Method 1:

The reference cell may be changed when the cell used for RA preamble transmission is changed.

The reference cell is considered lost/undefined if any of the following occurs: (1) the reference cell has been deactivated or deconfigured, and no new RA procedure is triggered yet; (2) the reference cell has been removed from the TAG, and no new RA procedure is triggered yet; or (3) TAG reconfiguration occurs, and no new RA procedure is triggered yet.

The reference cell can be re-established via triggering of the RACH procedure to achieve UL synchronization for the sTAG, i.e., the new cell used for RA-preamble transmission is the new reference cell.

If the reference cell is changed/lost/undefined within a TAG and if the TAT for the TAG is still running, the UL transmission for all SCells in the TAG is stopped or suspended (e.g. via expiry of the associated TAT, or by deactivation of the SCells in the TAG) except for RA preamble transmission in response to a PDCCH order. After successful completion of the random access procedure or successful reception of the random access response (RAR), the TAC from the RAR is applied for the sTAG and UL transmissions can resume as normal (e.g., the TAT is restarted).

If the RA procedure that establishes the new reference cell is still on-going (e.g., the RA procedure is performed on a SCell in an SCell-only TA group and the SCell performing the Random Access is not the current timing reference cell), a number of alternatives may be considered.

In a first alternative, the UL transmission for all SCells in the TAG is stopped or suspended (e.g., via expiry of the associated TAT, or by deactivation of the SCells in the TAG) except for RA preamble transmission in response to a PDCCH order. After successful completion of the random access procedure or successful reception of the random access response, the TAC from the RAR is applied for the sTAG and the UL transmissions can resume as normal (e.g., the TAT is restarted).

In a second alternative, the UL transmission for all SCells in the TAG can continue as normal during the RA procedure (as long as the TAT is still running). Two DL timing references are defined during the RA procedure:

First DL timing reference: The DL timing of the current reference cell, which is used as the reference for all UL transmissions for SCells in the sTAG except for the SCell performing RA preamble transmission.

Second DL timing reference: The DL timing of the SCell performing RA preamble transmission, which is used as the reference for the RA preamble transmission and the subsequent RA preamble retransmission if required.

If Msg2 reception is successful, the DL timing reference for all the SCells in the sTAG is the second DL timing reference (for Msg3 transmission for the SCell used for RA preamble transmission and for all UL transmissions for other SCell(s) in the sTAG). If Msg2 reception is unsuccessful and as a result the RA procedure is aborted, the DL timing reference is the first DL timing reference, used for all UL transmissions for all SCells in the sTAG (with the possible exception of RA preamble transmission).

In a third alternative, the UL transmission for all SCells in the TAG is stopped or suspended (e.g., via expiry of the associated TAT, or by deactivation of the SCells in the TAG) except for RA preamble transmission in response to a new PDCCH order. After successful completion of the random access procedure or successful reception of the random access response, the TAC from the RAR is applied for the sTAG and the UL transmissions can resume as normal (e.g. the TAT is restarted). If the TAT expires during the SCell RA procedure, UL timing transmissions for all SCells in the sTAG except for the SCell used for RA preamble transmission stop and the second DL timing reference is effectively not used.

If the Random Access procedure is performed on a SCell in a SCell-only TA group and the SCell performing the Random Access is the current timing reference cell, the UE behavior regarding the DL timing reference and UL transmissions as in the pTAG can be applied.

If all SCells within a sTAG have been deactivated previously and one or more SCells in the sTAG are now re-activated and if the TAT for the sTAG is still running, a number of alternatives may be considered. In a first alternative, in order to avoid any potential UL interference, the UL transmissions for all SCells in the sTAG do not resume or occur (e.g., the transmissions can be achieved by immediate expiry of the associated TAT), except for RA preamble transmission in response to a PDCCH order. After successful completion of the random access procedure or successful reception of the random access response, the UL transmissions can resume or occur as normal.

In a second alternative, in order to reduce the chance of UL service interruption, the UL transmissions for all SCells in the sTAG can resume or occur as normal if the SCell used as the reference cell before is also re-activated. Otherwise, the UL transmissions for the re-activated SCells do not resume or occur until the deactivated reference cell is re-activated again and the TAT is still running, or if the reference cell is changed to one of the existing activated SCells and the TAT is running. In a third alternative, the UL transmissions for all SCells in the sTAG can resume or occur as normal using the same UL timing just before the deactivation of the reference cell. The UL timing is applicable until the UE receives a new TAC or if a RACH procedure is triggered on a cell. This option also reduces the chance of UL service interruption.

If the TAG ID of the SCell(s) is reconfigured (e.g., by RRC) and if the TAG ID is associated with an existing sTAG with a running TAT, the UL transmissions of the SCell(s) with reconfigured TAG ID follow the UL timing of the existing sTAG. It is assumed that there is already another reference cell in the TAG.

If the TAG ID of the SCell(s) is reconfigured (e.g., by RRC) and if there is no existing running TAT associated with the sTAG (e.g., if the sTAG is newly configured or if the associated TAT has previously expired), the UL transmission is stopped or suspended except for RA preamble transmission in response to a PDCCH order, which can be scheduled on a cell in the sTAG. After successful completion of the random access procedure or successful reception of the random access response, the UL transmission can resume as normal.

Method 2:

The reference cell may be changed by higher layer signaling. The reference cell is considered lost or undefined if the current reference cell has been deactivated or deconfigured without new RRC signaling to indicate a new reference cell. The reference cell is also considered lost of undefined if the current reference cell has been removed from the sTAG without new RRC signaling to indicate a new reference cell.

If the reference cell is changed within a sTAG and if the TAT for the sTAG is running, a number of alternatives may be considered. In a first alternative, the on-going UL transmissions continue as normal initially using the existing UL timing (i.e., the timing before the reference cell change). When there is no Timing Advance Command (TAC) received and the new DL timing reference as a result of reference cell change is such that the transmission timing error between the UE and the new reference timing exceeds $\pm T_e$, the UE adjusts its timing to within $\pm T_e$ according to the procedure as defined in Section 7.1 in REF7.

In a second alternative, the UL transmission for all SCells in the sTAG is stopped or suspended (e.g., via expiry of the associated TAT, or by deactivation of the SCells in the TAG) except for RA preamble transmission in response to a PDCCH order for the new reference cell. After successful completion of the random access procedure or successful reception of the random access response for the new reference cell, the UL transmissions can resume as normal (e.g., the TAT is restarted).

In a third alternative, the new reference point for the UE transmit timing control requirement after the change of the reference cell is the downlink timing of the new reference cell minus $(N_{TA\_Ref}+N_{TA\_offset}) \times T_s + \Delta_{DL\text{-}timing\text{-}diff}$, where $\Delta_{DL\text{-}timing\text{-}diff}$ is the DL timing difference between the new reference cell and the previous reference cell.

If the reference cell is lost or undefined within a sTAG and if the TAT for the sTAG is running, a number of alternatives may be considered. In a first alternative, the UL transmission for all SCells in the TAG is stopped or suspended (e.g., via expiry of the associated TAT, or by deactivation of the SCells in the TAG) until a new reference cell is configured by higher layer signaling and the procedure described above for a reference cell change can take place.

In a second alternative, the UL timing for the TAG is unchanged until a TAC is received by the UE in a MAC Control Element or in a Random Access Response. In a third alternative, the new initial reference point for the UE transmit timing control requirement after the change of the reference cell is the downlink timing of the new reference cell minus $(N_{TA\_Ref}+N_{TA\_offset}) \times T_s + \Delta_{DL\text{-}timing\text{-}diff}$, where $\Delta_{DL\text{-}timing\text{-}diff}$ is the DL timing difference between the new reference cell and the previous reference cell.

If the TAG ID of the SCell(s) is reconfigured (e.g., by RRC) and if the TAG ID is associated with an existing TAG with a running TAT, the UL transmissions of the SCell(s) with reconfigured TAG ID follows the UL timing of the existing TAG. It is assumed that there is already another reference cell in the existing TAG.

If the TAG ID of the SCell(s) is reconfigured (e.g., by RRC) and if there is no existing running TAT associated with the TAG (e.g., if the TAG is newly configured or if the TAT has previously expired), the UL transmission is stopped or suspended (e.g., by expiry of the TAT of the TAG, or by deactivation of the SCell(s) in the sTAG), except for RA preamble transmission in response to a PDCCH order, which can be scheduled on a cell in the TAG. After successful completion of the random access procedure or successful reception of the random access response, the UL transmission can resume as normal.

Method 3:

The reference cell may be changed by any the following: (a) the current reference cell has been deactivated or deconfigured; (b) the current reference cell has been removed from the TAG; or (c) TAG reconfiguration.

If the reference cell is changed within a TAG and if the TAT for the TAG is running, a number of alternatives may be considered. In a first alternative, the on-going UL transmissions continue as normal initially using the existing UL timing (i.e., the timing before the reference cell change). When there is no Timing Advance Command (TAC) received and the new DL timing reference is such that the transmission timing error between the UE and the new reference timing exceeds $\pm T_e$, the UE adjusts its timing to within $\pm T_e$ according to the procedure as defined in Section 7.1 in REF7.

In a second alternative, the UL transmission for all SCells in the TAG is stopped or suspended (e.g., via expiry of the associated TAT, or by deactivation of the SCells in the TAG) except for RA preamble transmission in response to a PDCCH order. After successful completion of the random access procedure or successful reception of the random access response, the UL transmissions can resume as normal (e.g., the TAT is restarted). In a third alternative, the UL timing for the TAG is unchanged until a TAC is received by the UE in a MAC Control Element or in a Random Access Response.

In a fourth alternative, the new initial reference point for the UE transmit timing control requirement after the change of the reference cell is the downlink timing of the new reference cell minus $(N_{TA\_Ref}+N_{TA\_offset}) \times T_s + \Delta_{DL\text{-}timing\text{-}diff}$, where $\Delta_{DL\text{-}timing\text{-}diff}$ is the DL timing difference between the new reference cell and the previous reference cell.

If the TAG ID of the SCell(s) is reconfigured (e.g., by RRC) and if the TAG ID is associated with an existing TAG with a running TAT, the UL transmissions of the SCell(s) with reconfigured TAG ID follows the UL timing of the existing TAG. It is assumed that there is already another reference cell in the existing TAG.

If the TAG ID of the SCell(s) is reconfigured (e.g., by RRC) and if there is no existing running TAT associated with the TAG (e.g., if the TAG is newly configured or if the TAT has previously expired), the UL transmission is stopped or suspended (e.g., by expiry of the TAT of the TAG, or by deactivation of the SCell(s) in the sTAG), except for RA preamble transmission in response to a PDCCH order, which can scheduled on a cell in the TAG. After successful completion of the random access procedure or successful reception of the random access response, the UL transmission can resume as normal.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. For use in a user equipment (UE), a method for determining a timing reference for a secondary cell (SCell) in a secondary timing advance group (sTAG), the method comprising:
    selecting a SCell among a plurality of SCells within a sTAG as an uplink timing reference cell based on a predefined rule that is known at the UE and an eNB in communication with the UE; and
    receiving a downlink carrier from the selected SCell and determining, from the downlink carrier, a downlink timing used as a reference for an uplink transmission timing.

2. The method of claim 1, wherein the predefined rule comprises selecting any activated SCell within the sTAG as the uplink timing reference cell.

3. The method of claim 1, wherein the predefined rule comprises selecting any configured SCell within the sTAG as the uplink timing reference cell.

4. The method of claim 1, wherein the predefined rule comprises selecting, as the uplink timing reference cell, an activated SCell having a smallest SCellIndex value within the sTAG.

5. The method of claim 1, wherein the predefined rule comprises selecting, as the uplink timing reference cell, an activated SCell whose deactivation timer has the most time remaining before expiration.

6. The method of claim 1, wherein the predefined rule comprises selecting, as the uplink timing reference cell, an activated SCell having a best channel quality.

7. The method of claim 1, wherein the predefined rule comprises selecting, as the uplink timing reference cell, a configured SCell having a smallest SCellIndex value within the sTAG or a configured SCell having a best channel quality.

8. The method of claim 1, further comprising:
    selecting a new downlink timing reference upon selecting the SCell as the uplink timing reference cell.

9. The method of claim 8, wherein selecting the new downlink timing reference comprises selecting any activated SCell within the sTAG as the new downlink timing reference.

10. The method of claim 8, further comprising:
gradually adjusting an uplink timing to be equal to a downlink timing of the new downlink timing reference minus $(N_{TA} + N_{TA\ offset}) \times T_S$, where $N_{TA}$ is determined from a Msg2 TAC, $N_{TAOffset}$ is a predefined timing offset, and $T_s$ is a basic timing unit.

11. A user equipment (UE) configured to determine a timing reference for a secondary cell (SCell) in a secondary timing advance group (sTAG), the UE comprising:
a processor configured to:
select a SCell among a plurality of SCells within a sTAG as an uplink timing reference cell based on a predefined rule that is known at the UE and an eNB in communication with the UE; and
receive a downlink carrier from the selected SCell and determine, from the downlink carrier, a downlink timing used as a reference for an uplink transmission timing.

12. The UE of claim 11, wherein the predefined rule comprises selecting any activated SCell within the sTAG as the uplink timing reference cell.

13. The UE of claim 11, wherein the predefined rule comprises selecting any configured SCell within the sTAG as the uplink timing reference cell.

14. The UE of claim 11, wherein the predefined rule comprises selecting, as the uplink timing reference cell, an activated SCell having a smallest SCellIndex value within the sTAG.

15. The UE of claim 11, wherein the predefined rule comprises selecting, as the uplink timing reference cell, an activated SCell whose deactivation timer has the most time remaining before expiration.

16. The UE of claim 11, wherein the predefined rule comprises selecting, as the uplink timing reference cell, an activated SCell having a best channel quality.

17. The UE of claim 11, wherein the predefined rule comprises selecting, as the uplink timing reference cell, a configured SCell having a smallest SCellIndex value within the sTAG or a configured SCell having a best channel quality.

18. The UE of claim 11, the processor further configured to:
select a new downlink timing reference upon selecting the SCell as the uplink timing reference cell.

19. The UE of claim 18, wherein the processor is configured to select the new downlink timing reference by selecting any activated SCell within the sTAG as the new downlink timing reference.

20. The UE of claim 18, the processor further configured to:
gradually adjust an uplink timing to be equal to a downlink timing of the new downlink ming reference minus $(N_{TA} + N_{TA\ offset}) \times T_S$, where $N_{TA}$ is determined from a Msg2 TAC, $N_{TAOffset}$ is a predefined timing offset, and $T_s$ is a basic timing unit.

* * * * *